US008892563B2

(12) United States Patent
Chun et al.

(10) Patent No.: US 8,892,563 B2
(45) Date of Patent: Nov. 18, 2014

(54) STORAGE MEDIUM INCLUDING METADATA AND REPRODUCTION APPARATUS AND METHOD THEREFOR

(75) Inventors: Hye-jeong Chun, Yongin-si (KR); Sung-wook Park, Seoul (KR); Kil-soo Jung, Hwaseong-si (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1536 days.

(21) Appl. No.: 11/176,239

(22) Filed: Jul. 8, 2005

(65) Prior Publication Data

US 2006/0026144 A1 Feb. 2, 2006

(30) Foreign Application Priority Data

Jul. 30, 2004 (KR) .................. 10-2004-0060281
Dec. 17, 2004 (KR) .................. 10-2004-0108022

(51) Int. Cl.
*G06F 7/00* (2006.01)
*G06F 17/30* (2006.01)
(52) U.S. Cl.
CPC .................. *G06F 17/3082* (2013.01)
USPC ............................................... 707/741
(58) Field of Classification Search
USPC .......................................... 707/3, 741
See application file for complete search history.

(56) References Cited

U.S. PATENT DOCUMENTS

| 5,354,097 A | | 10/1994 | Tel |
| 5,915,008 A | * | 6/1999 | Dulman .................. 379/221.08 |
| 5,945,988 A | * | 8/1999 | Williams et al. ............... 715/747 |
| 6,192,340 B1 | * | 2/2001 | Abecassis ...................... 704/270 |
| 6,338,088 B1 | * | 1/2002 | Waters et al. .................. 709/226 |
| 2001/0014210 A1 | | 8/2001 | Kang |
| 2002/0059342 A1 | | 5/2002 | Gupta et al. |
| 2002/0100046 A1 | * | 7/2002 | Dudkiewicz .................... 725/46 |
| 2002/0198864 A1 | * | 12/2002 | Ostermann et al. ............... 707/1 |
| 2003/0026594 A1 | * | 2/2003 | Shiiyama ........................ 386/69 |

(Continued)

FOREIGN PATENT DOCUMENTS

| CA | 2 482 431 | 10/2003 |
| CN | 1312650 A | 9/2001 |

(Continued)

OTHER PUBLICATIONS

Search Report issued in International Patent Application No. PCT/KR2005/002430 on Oct. 27, 2005.

(Continued)

*Primary Examiner* — Truong Vo
(74) *Attorney, Agent, or Firm* — NSIP Law

(57) ABSTRACT

A storage medium including metadata, which provide an extended search function using a variety of search keywords on audio-visual data, and a reproduction apparatus and a reproduction method of reproducing the storage medium. The storage medium includes: audio-visual data; and metadata to provide an extended search function on the audio-visual data, wherein the metadata include a predefined search keyword and a search keyword which may be additionally defined by an author. Accordingly, by using a variety of search keywords additionally defined by an author as well as predefined search keywords, providing an extended search function is possible. In addition, by recording only portions of the metadata relative directly to supporting multiple languages in an additional text-based file, providing an extended search function using a plurality of languages is also possible.

24 Claims, 15 Drawing Sheets

(56) References Cited

U.S. PATENT DOCUMENTS

| | | | |
|---|---|---|---|
| 2003/0050927 A1 | 3/2003 | Hussam | |
| 2003/0121040 A1* | 6/2003 | Ferman et al. | 725/40 |
| 2003/0122860 A1* | 7/2003 | Ino | 345/716 |
| 2004/0047589 A1* | 3/2004 | Kim | 386/46 |
| 2004/0189694 A1* | 9/2004 | Kurtz et al. | 345/738 |
| 2004/0194141 A1* | 9/2004 | Sanders | 725/53 |
| 2004/0263529 A1* | 12/2004 | Okada et al. | 345/619 |
| 2005/0069225 A1* | 3/2005 | Schneider et al. | 382/305 |
| 2005/0149557 A1* | 7/2005 | Moriya et al. | 707/104.1 |

FOREIGN PATENT DOCUMENTS

| | | | |
|---|---|---|---|
| CN | 1745424 A | | 3/2006 |
| EP | 1 102 271 | | 5/2001 |
| EP | 1 102 276 | | 5/2001 |
| JP | 2001-184802 | | 7/2001 |
| JP | 2001-216726 | | 8/2001 |
| JP | 2002-108892 | | 4/2002 |
| JP | 2002-044586 | * 8/2002 | 5/765 |
| JP | 2003-122761 | | 4/2003 |
| KR | 10-2005-0012101 | | 1/2005 |
| WO | WO 02/13065 A1 | | 2/2002 |
| WO | WO 03/102953 A1 | | 12/2003 |

OTHER PUBLICATIONS

Preliminary Notice of the First Office Action issued in Taiwanese Patent Application No. 94123496 on Oct. 28, 2008.
U.S. Appl. No. 12/346,057, filed Dec. 30, 2008, Hye-jeong Chun et al., Samsung Electronics Co., LTD.
"Versioning Document Annotations In A Collaborative Session" IBM Technical Disclosure Bulletin, IBM Corp. New York, US, vol. 38, No. 9.
International Business Machines Corporation: "Multiple-search of video segments indexed by time-aligned annotations of video content" Research Disclosure, Mason Publications, Hampshire, GB, vol. 431, No. 191.
Search Report issued in European Patent Application No. 05780635.8 on Dec. 17, 2008.
Office Action issued in Chinese Patent Application 200580025709.6 dated Apr. 3, 2009.
Office Action issued in Chinese Patent Application 200710104699.6 dated Jun. 5, 2009.
Office Action issued in Mexican Patent Application No. MX/a/2007/001170 on Aug. 20, 2009.
Mexican Office Action Issued on Jan. 20, 2010, in corresponding Mexican Application No. MX/a/2007/001170 (3 pages).
Malaysian Office Action issued Jan. 15, 2013 in counterpart Malaysian Patent Application No. PI20085174 (3 pages, in English).
European Summons to Oral Proceedings issued Mar. 14, 2013 in counterpart European Patent Application No. 05780635.8 (9 pages in English).
European Decision to Refuse a European Patent application, issued Sep. 30, 2013 in counterpart European Patent Application No. 05780635.8 (13 pages in English).
European Examination Report mailed Oct. 11, 2012, issued in counterpart European Patent Application No. 05 780 635.8; 6 pages in English language.
Mexican Office Action issued on Feb. 4, 2011, in corresponding Mexican Patent Application No. MX/a/2007/001170 (3 pages).

* cited by examiner

FIG. 13B

```
<discinfo>
    <authordef>
            <name>supporting_actress</name>
            <authordef>
                <name>actress1</name>
                <authordef>
                    <name>Profile</name>
                    <authordef>
                        <name>Performed In: Movie1,
                        Movie2, Act_A, Musical_A</name>
                    </authordef>
                </authordef>
            </authordef>
    </authordef>
</discinfo>
```

STORAGE MEDIUM INCLUDING METADATA AND REPRODUCTION APPARATUS AND METHOD THEREFOR

CROSS-REFERENCE TO RELATED APPLICATIONS

This application claims the benefit of Korean Application No. 2004-60281, filed Jul. 30, 2004, and Korean Application No. 2004-108022, filed Dec. 17, 2004, in the Korean Intellectual Property Office, the disclosures of which are incorporated herein by reference.

BACKGROUND OF THE INVENTION

1. Field of the Invention

An aspect of the present invention relates to reproduction of audio-visual (AV) data recorded in a storage medium, and, more particularly to a storage medium including metadata, which provide an extended search function using a variety of search keywords on audio-visual data, and an apparatus and method of reproducing the storage medium.

2. Description of the Related Art

Storage media such as DVDs may store audio-visual data including video data, audio data, and/or subtitles, all of which are compressed and encoded in accordance with standards such as Motion Picture Experts Group (MPEG). Such storage media may further store additional information such as encoding attributes of the audio-visual data or reproduction procedures of the audio-visual data. Accordingly, motion pictures that are recorded in the storage media are reproduced sequentially in accordance with the reproduction information. In some cases, the audio-visual data may be reproduced through a jump in a unit of chapters.

However, the conventional storage may not be reproduced through a jump to a desired scene in accordance with a user's search conditions. That is, there does not exist an apparatus or a method of reproducing audio-visual data in accordance with the user's desired search conditions such as scene, characters, locations, background music, properties, etc.

Since the audio-visual data are compressed, encoded, and multiplexed in accordance with the MPEG2 standard, conventional DVDs have problems in storing metadata that provides search functions on audio-visual data. Also there is little possibility to edit or reuse audio-visual data or metadata once the storage medium has been produced.

SUMMARY OF THE INVENTION

An aspect of the present invention provides a storage medium including metadata, which provide an extended search function using a variety of search keywords on audio-visual data, and an apparatus for and a method of reproducing the storage medium.

According to an aspect of the present invention, there is provided a storage medium including: audio-visual data; and metadata to provide an extended search function on the audio-visual data, wherein the metadata include a predefined search keyword and a search keyword which may be additionally defined by an author. The metadata may be embodied in a binary type, and the metadata may include additional text fields to additionally define the author-defined search keyword and a keyword value of the author-defined search keyword. The metadata may be embodied in a text-based markup language type, and the metadata may include additional elements or attributes for additionally defining the author-defined search keyword and a keyword value of the author-defined search keyword. Parameters irrelative to supporting multiple languages in the metadata may be included in a binary type in the audio-visual data, and parameters relative to supporting multiple languages may be embodied in an additional text-based file.

According to another aspect of the present invention, there is provided a reproduction apparatus comprising: a search unit to search a storage medium for a position of audio-visual data satisfying a predetermined search condition with reference to metadata, the storage medium including the audio-visual data and the metadata providing an extended search function on the audio-visual data; and a reproduction unit to reproduce the audio-visual data from the searched-out position, wherein the metadata includes a predetermined search keyword and a search keyword which may be additionally defined by an author. The search unit may select the metadata corresponding to language information supporting subtitle, audio, and/or menu stored in a system parameter.

According to another aspect of the present invention, there is provided a reproduction method comprising: searching a storage medium for a position of audio-visual data satisfying a predetermined search condition with reference to metadata, the storage medium including the audio-visual data and the metadata providing an extended search function on the audio-visual data; and reproducing the audio-visual data from the searched-out position, wherein the metadata includes a predetermined search keyword and a search keyword which may be additionally defined by an author.

According to another aspect of the present invention, there is provided a storage medium including: audio-visual data; and metadata to provide an extended search function on the audio-visual data, wherein the metadata include a predefined search keyword and a search keyword which may be additionally defined by an author, and the metadata are included in information on an entire disk and/or title information.

According to another aspect of the present invention, there is provided a reproduction apparatus comprising: a search unit to search a storage medium for information on an entire disk and/or title information satisfying a predetermined search condition with reference to metadata, the storage medium including the audio-visual data and the metadata providing an extended search function on the audio-visual data; and a display unit to display the information on the entire disk and/or title information, wherein the metadata includes a predetermined search keyword and a search keyword which may be additionally defined by an author.

According to another aspect of the present invention, there is provided a reproduction method comprising: searching a storage medium for information on an entire disk and/or title information satisfying a predetermined search condition with reference to metadata, the storage medium including the audio-visual data and the metadata providing an extended search function on the audio-visual data; and displaying the information on the entire disk and/or title information, wherein the metadata includes a predetermined search keyword and a search keyword which may be additionally defined by an author.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 13A and 13B are diagrams of nesting structure and an example of the author-defined metadata;

DETAILED DESCRIPTION OF THE EMBODIMENTS

Figure 1A:
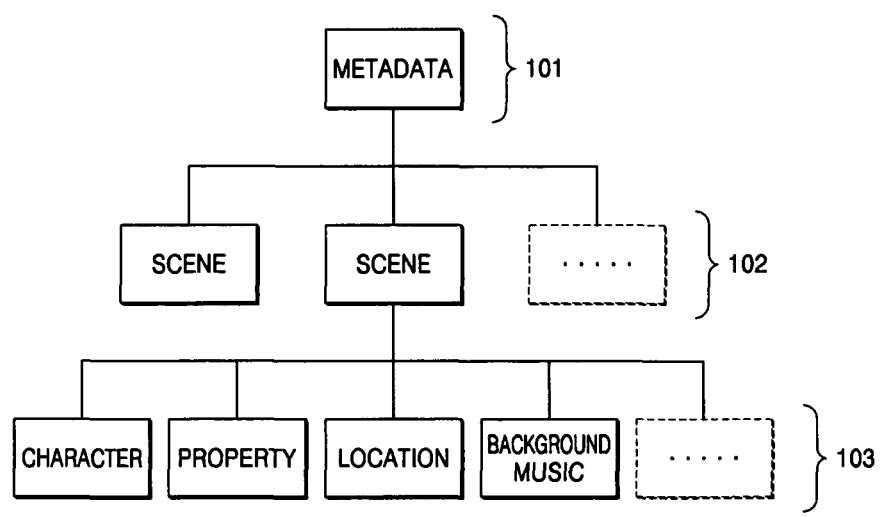
FIGS. 1A and 1B show embodiments of metadata according to the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
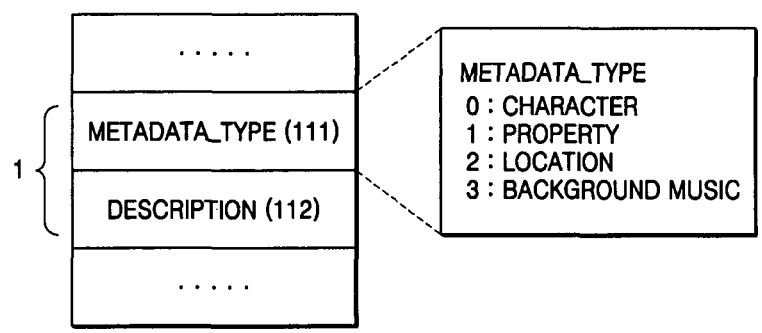

FIGS. 1A and 1B show embodiments of metadata according to the present invention. FIG. 1A shows text-based metadata and FIG. 1B shows binary-based metadata. Referring to FIG. 1A, text-based metadata 101 described in a markup language, etc., are divided in scene units 102 or chapters. The scene elements include specific elements 103 indicating characters, properties, locations, background music, etc., and the specific elements 103 may be used as search keywords for an extended search of audio-visual data.

On the other hand, referring to FIG. 1B, in binary-based metadata 1 used in a programming language such as C, C++, etc., binary codes shown in FIG. 1B may be included in a play list as a play sequence to reproduce a movie or in an audio-visual data stream. At this time, elements of the metadata which may be used as search keywords are preliminarily defined in a metadata type (metadata_type) 111. For example, characters are defined as a type value of "0", properties are defined as a type value of "1", locations are defined as a type value of "2", and background music is defined as a type value of "3" in advance.

Accordingly, the type values corresponding to desired search keywords among the predefined metadata type values are allocated to the search points 111 in the audio-visual data stream. Then, keyword values corresponding to the search keywords are allocated to respective description fields 112. For example, when a user intends to search out only those scenes in which the character "Neo" appears in the movie "The Matrix", "0" indicating a character in the metadata type 111 is allocated to the search points in which "Neo" appears in the audio-visual data stream, and "Neo" is specified as a description field 112 indicating the keyword value. As a result, a user may search out and reproduce only the scenes in which "Neo" appears from the audio-visual data stream.

That is, while storage media such as conventional DVDs support only reproduction based on scenes, chapters, or time, the metadata embodied as shown in FIG. 1A or 1B may provide an extended search function.

However, in FIG. 1A or 1B, there is a problem in that a new search keyword may not be added because the search keywords are defined in advance in the audio-visual data stream. A structure of metadata to which an author may additionally define a search keyword will be described as metadata for the extended search.

Figure 2:
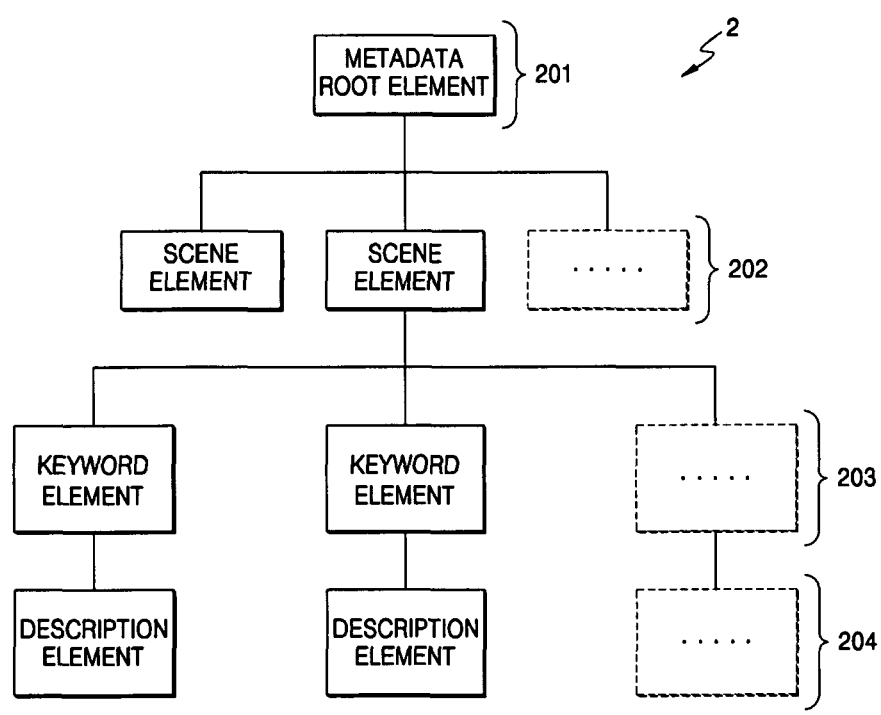
FIG. 2 shows an embodiment of metadata to which an author may add a search keyword according to the present invention.

FIG. 2 shows an embodiment of metadata to which an author may add a search keyword according to the present invention. Referring to FIG. 2, a tree structure of a markup document 2 in which metadata is embodied is shown. Scene elements 202 are included as specific elements of the metadata elements 201, and keyword elements 203 are included as specific elements of the scene elements. Each keyword element 203 has a search keyword, which an author has an opportunity to additionally define, as a content of the corresponding element. A description element 204 having a keyword value corresponding to the author-defined search keyword as content thereof is included as a specific element of each keyword element 203. On the other hand, the keyword element 203 or the description element 204 may be embodied as an attribute instead of the specific element of the scene element 202.

Figure 3:
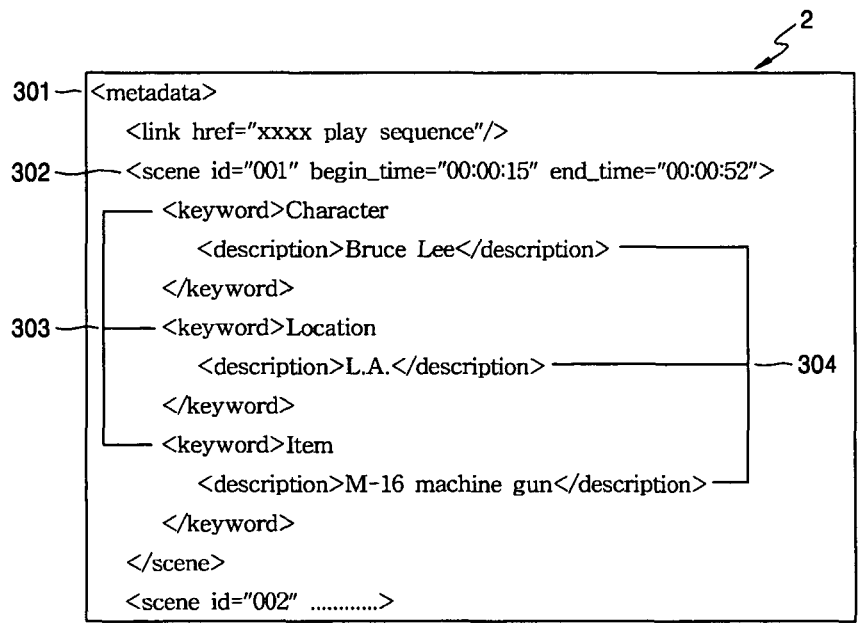
FIG. 3 shows an embodiment in which the structure of metadata shown in FIG. 2 is embodied in a text type.

More specifically, an example of a markup document in which the metadata shown in FIG. 2 are described in a markup language will be presented. FIG. 3 shows an example in which the metadata structure shown in FIG. 2 is embodied in a text type.

Referring to FIG. 3, the markup document 2 in which the metadata according to the present invention is described includes a metadata element <metadata> 301, a scene element <scene> 302, keyword elements <keyword> 303, and a description element <description> 304. The metadata element <metadata> 301 includes link information on a play sequence <link href="xxxx play sequence"/>. The metadata element includes the scene element <scene> 302 as a specific element. The scene element <scene> 302 includes the keyword elements <keyword> 303 having a variety of author-defined search keywords as contents and the description elements <description> 304 having keyword values corresponding to the search keywords as specific elements. For example, in order to use a character as a new search keyword at scene ID "001", "Character" may be defined as a content of element <keyword> and "Bruce Lee" may be defined as a content of element <description>, which is a keyword value corresponding to the search keyword "Character". Otherwise, locations and properties may be also defined as a new search keyword.

That is, in the metadata according to the present embodiment, the search keywords are not defined in advance as shown in FIGS. 1A and 1B, but the search keywords as contents of the keyword elements may be additionally defined by an author. Accordingly, the author may newly define and use a variety of search keywords without restriction and without conventional terms used at the time of producing a title.

Figure 4:
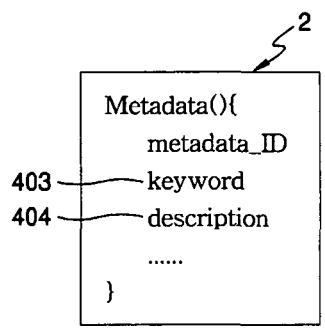
FIG. 4 shows another embodiment of metadata to which an author may add a search keyword according to the present invention.

On the other hand, FIG. 4 shows another embodiment of metadata in which an author may add search keywords according to the present invention. Referring to FIG. 4, an example of binary-based metadata is illustrated. The metadata according to the present embodiment includes two text-type fields such that an author may newly define and use not only a description field 404 indicating a keyword value but also a keyword field 403 to indicate a search keyword, similarly to the text-based metadata shown in FIG. 3. While only the predefined search keywords in the metadata type field are used in FIG. 1B, a variety of search keywords may be added by an author using the keyword field 403 in the present embodiment.

Figure 5:
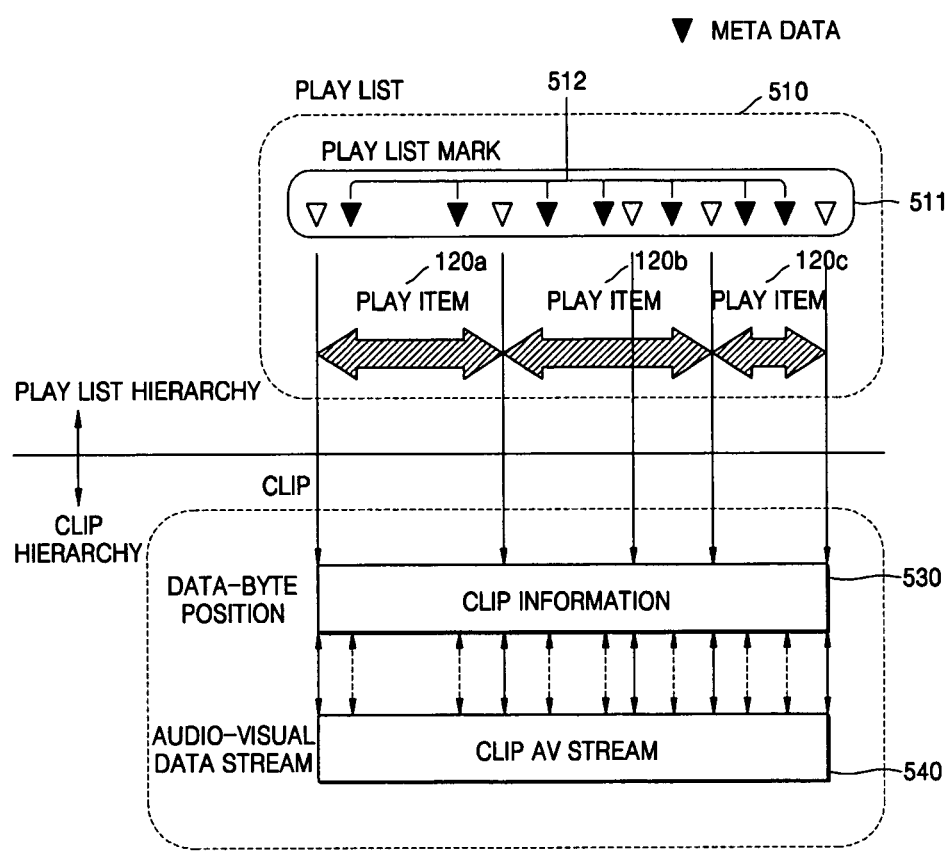
FIG. 5 is a diagram illustrating a structure of audio-visual data including metadata according to an embodiment of the present invention.

Next, relations between the metadata in which the author may add a new search keyword and the audio-visual data providing high-quality video will be described. FIG. 5 is a diagram to illustrate a structure of the audio-visual data including the metadata according to an embodiment of the present invention. Referring to FIG. 5, a clip, which acts as a recording unit of the audio-visual data, and a play list, which acts as a unit of reproduction, are shown. Specifically, the above-mentioned play sequence is embodied as the play list.

The clip as a recording unit of the audio-visual data includes a clip A/V stream 540 in which a video data stream, an audio data stream, and other data streams compressed and encoded are recorded and clip information 530 in which information on encoding attributes for the clip A/V stream 540 is recorded. The clip A/V stream 540 multiplexes the video data stream, the audio data stream, and other data streams, compresses and encodes the multiplexed data streams, and records the compressed and encoded data streams. Each packet is identified by a Packet Identification (PID) as a packet identifier.

On the other hand, the play list 510 to indicate a play sequence which specifies a reproduction order of the audio-visual data as a unit of reproduction includes play items 120a to 120c. That is, the play list 510 includes a plurality of play items (in this case, play items 120a to 120c).

Specifically, the play list 510 further includes a play list mark 511 to indicate specific positions of the above-mentioned clip. The play list mark includes the metadata 512 to provide an extended search function according to an embodiment of the present invention. An example in which the metadata 512 is included and recorded in the play list mark 511 of the play list 510 is shown in FIG. 5. While it is understood that the metadata 512 may be defined separately from the play list mark 511 of the play list 510, or may be recorded in a binary type or a text type in a space independent of the play list 510, for the convenience of explanation, the example where the metadata are included in the play list mark of the play list is described based on FIG. 5.

The play items 120a to 120c include information such as "name" and "IN_time" and "OUT_time" of the clip information 530 file to be reproduced, so as to specify a clip or clips to be reproduced and a reproducing position or positions in the corresponding clip.

Specifically, as shown in the figure, the play list mark 511, used to specify a specific position in the play list, has the following structure.

Figure 6:
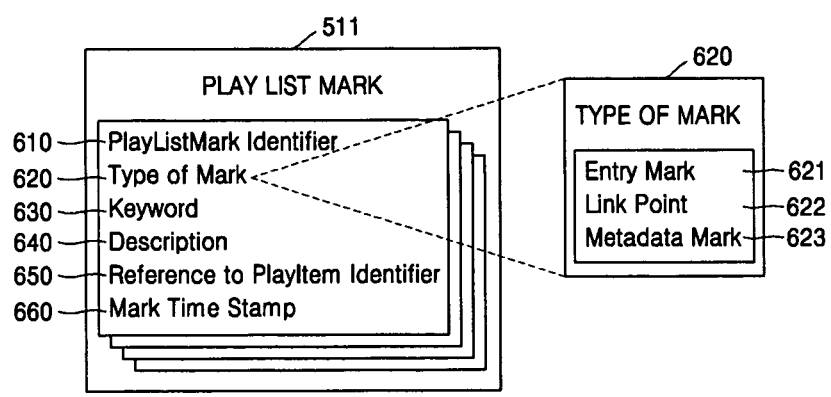
FIG. 6 is a diagram illustrating a structure of a play list mark in the audio-visual data including the metadata according to an embodiment of the present invention.

FIG. 6 is a diagram illustrating the structure of the play list mark in the audio-visual data including the metadata according to an embodiment of the present invention. Referring to FIG. 6, the play list mark 511 includes an inherent identifier information (PlayListMark Identifier) field 610 to indicate the identifier of the play list mark, a mark type information (Type of Mark) field 620 to indicate the purpose of the play list mark, a keyword (Keyword) field 630 and a description (Description) field 640 to be effective only when the mark type is a metadata mark, an inherent identifier information (Reference to Playitem Identifier) field 650 to indicate the identifier of the play item corresponding to the mark, and a mark time stamp (Mark Time Stamp) field 660 to indicate time information, including time points of the play item at which the play list mark is positioned. Any one of an entry mark (Entry Mark) 621, a link point (Link Point) 622, and the metadata mark (Metadata Mark) 623, according to an embodiment of the present invention, is allocated to the mark type field 620 to indicate the purpose of the play list markHere, the metadata mark 623 is allocated to the mark type field 620.

As is described above, the metadata enables an author to newly define a search keyword using the keyword field 630 and to designate a keyword value corresponding to the search keyword using the description field 640. Accordingly, the author may newly add a variety of search keywords.

On the other hand, since the play list mark 511 including the metadata is included in a binary type in the play list as shown in FIG. 5, the play list mark is included in "In-Mux" type in the audio-visual data stream. Accordingly, binding the metadata to the audio-visual data stream is relatively easy and providing the extended search function using a variety of keywords that are defined by an author at the time of reproduction thereof is possible.

However, it is understood that the play list mark 511 included in a binary type in the play list 510 may additionally provide support for multiple languages. That is, the reproduction apparatus to reproduce data recorded on the storage medium, according to the present invention, loads all the play lists on a memory, then extracts search keywords, which may be selected from the metadata information by a user by using an application having a programming function recorded in the storage medium or a specific module in the reproduction apparatus, and displays the extracted search keywords on a display unit. At this time, the search keywords are displayed in a specific language recorded in the keywords and descriptions when first preparing the metadata. That is, the play list mark 511 included in a binary type in the play list has a disadvantage of not supporting multiple languages.

Here, preparing the play list in all languages to support a plurality of languages is not desirable. This is due to the fact that great resources included in the keyword and description fields so as to support such a plurality of languages require a greater memory.

Figure 7:
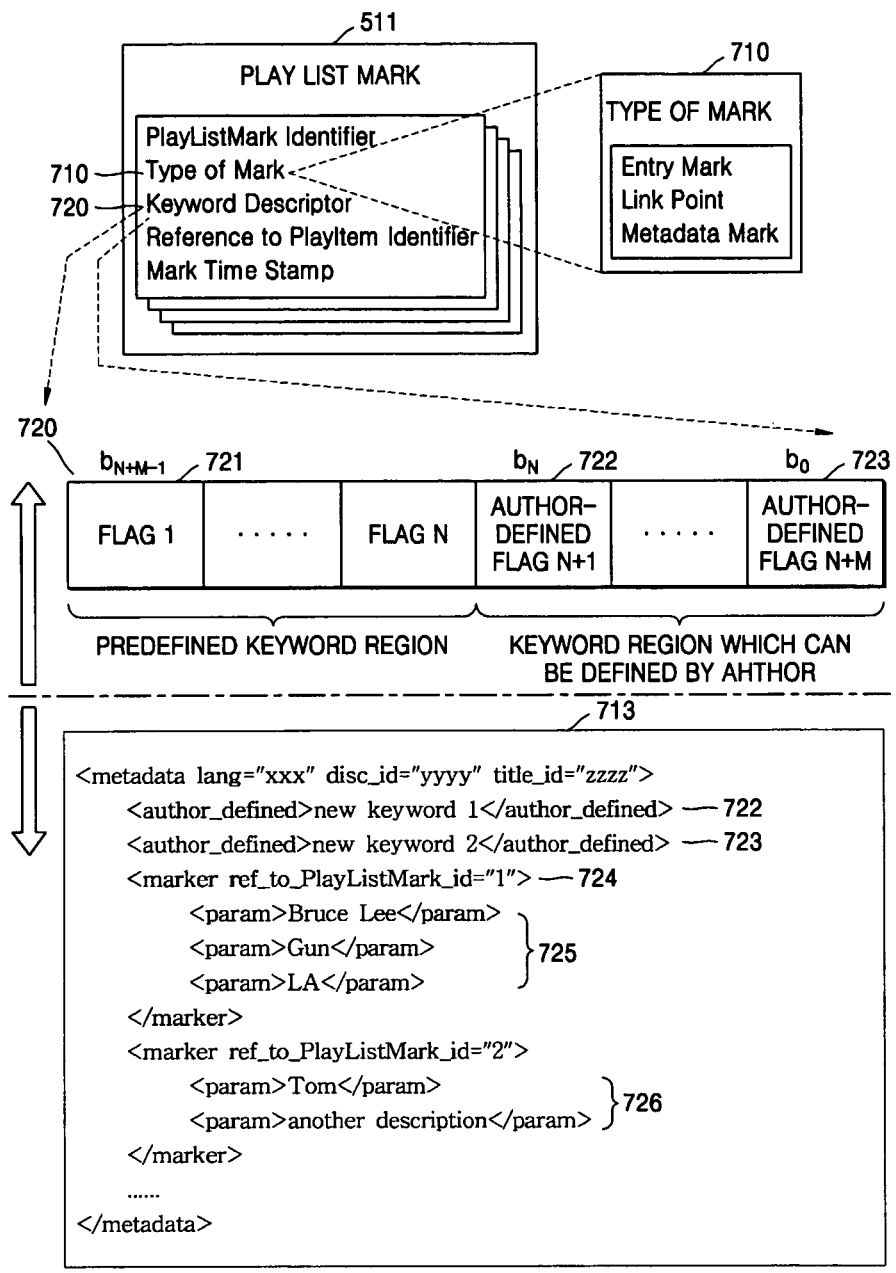
FIG. 7 is a diagram illustrating a structure of the metadata supporting multiple languages according to an embodiment of the present invention.

In order to solve such a problem, the structure of metadata to support the plurality of languages is now described as another embodiment of the present invention. FIG. 7 is a diagram illustrating a structure of the metadata to support multiple languages according to an embodiment of the present invention.

As is described above, general audio-visual data are multiplexed into a variety of applications such as graphic streams for subtitles or menus in a main audio-video data stream. This is due to the fact that binding and synchronizing the applications with the main audio-visual data stream is relatively easy.

Therefore, in another embodiment of the present invention, only the keyword portions and the description portions of the metadata that are directly relative to the support for multiple languages are embodied in an additional text-based metadata type, and the identifier information or the time information of the metadata directly irrelative to the support for multiple languages are included in a binary type in the main audio-visual data stream.

Accordingly, the reproduction apparatus may obtain the metadata, the time of application, and information on the predefined keywords using the play list included in the main audio-visual data stream. By defining only the author-defined keywords and the descriptions thereof in the text-based metadata file, reducing the size of the metadata file is possible. In addition, since the keywords and the descriptions thereof exist in a particular file other than the main audio-visual data stream, supporting multiple languages is also possible.

Referring to FIG. 7, the metadata mark providing the extended search function is defined as a kind of mark type 710 in the play list mark 511. A keyword descriptor (Keyword Descriptor) field 720, being effective only when the mark type is a metadata mark, is also defined in the play list mark 511. The keyword descriptor field 720 has a predetermined number of bits. The keyword descriptor field 720 is divided into a flag region to indicate an existence of a specific keyword defined in advance and a flag region to indicate existence of a predetermined keyword which may be additionally defined by an author. For example, suppose that the keyword descriptor field 720 consists of N+M bits, where the N bits, corresponding to the former flag region 721, indicate the existence of N predefined search keywords and the M bits, corresponding to the latter flag region 722, indicate the existence of M author-defined search keywords. When a search keyword of the corresponding bit exists, a value "1b" is allocated. When a search keyword of the corresponding bit does not exist, a value "0b" is allocated.

Referring to the bit structure of the keyword descriptor 720 shown in FIG. 7, for example, when "character" indicating a character is allocated as a predefined search keyword to an author-defined Flag 1 721 of a bit, the value of "0b" set to the bit indicates that the corresponding search keyword is not effective. The value of "1b" set to the bit means that the search keyword corresponding to "character" is effective. The same is true of an author-defined flag 722 of another bit. In this way, effectiveness of a search keyword may be indicated using the keyword descriptor field 720.

On the other hand, the text-based metadata file 713 exists separately from the above-mentioned play list mark 511 so as to support multiple languages. It is desirable that the text-based metadata file 713 includes language information to indicate supported languages as attribute information ("lang" in the figure) so as to support multiple languages. Specifically, it is desirable that the same language code as is designated in a reproduction apparatus status register to store language information on any one of a subtitle, audio data, and a menu of the reproduction apparatus is used for the language information. Furthermore, since the text-based metadata file 713 is independent of the above-mentioned play list mark 511, it is desirable that the text-based metadata file 713 includes identifiers of the storage medium ("disc_id" in the figure) and/or title identifier information ("title_id" in the figure) for the binding to the main audio-visual data stream.

The metadata file 713 shown at the lower end of FIG. 7 includes elements <author_defined> 722 and 723 for the search keywords which may be defined by the author. The search keywords, newly defined by the author, are used as contents of the elements. At this time, the first element 722 for the author-defined search keyword is a search keyword corresponding to the first bit having the value of "1b" in the author-defined flag of the above-mentioned keyword descriptor 721. For example, when the (N+1)-th bit of the keyword descriptor 720 is "1b", the element <author_defined> 722 which is first defined in the metadata file 713 indicates the corresponding search keyword. An element <marker> 724 having the keyword value corresponding to the search keyword as a content is also included. An element <param> 725 having the keyword values of a plurality of search keywords applied at the corresponding mark time point as a content may be further included as a specific element. Of course, the keyword values may be expressed in an attribute type, instead of the element <param>.

Specifically, it is assumed that the keyword descriptor 720 included in the play list mark of FIG. 7 has 8 bits and the value thereof is "01001100". The sixth, third, and second bits may have the value of "1b", the sixth bit may indicate "character" as a predefined search keyword, and the elements <author_defined> of the third and second bits may indicate "property" and "location" in the additional metadata file 713, respectively. At this time, the keyword values corresponding to the search keywords are "Bruce", "Gun", and "LA" as defined by the elements <param> 725.

Of course, the elements <author_defined> may indicate "소품" and "배경장소", respectively, and the elements <param> 725 may indicate "브루스", "총", and "로스엔젤리스", respectively, in Korean. Accordingly, providing the extended search function supporting multiple languages correspondingly to the language required by a user is possible.

A reproduction apparatus and a reproduction method to reproduce the storage medium including the above-mentioned metadata will now be described.

Figure 8:
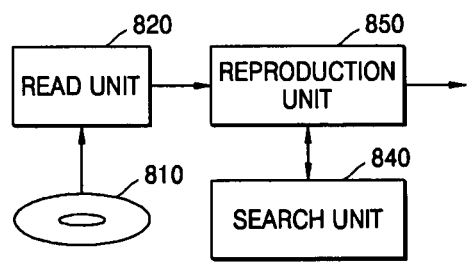
FIG. 8 is a block diagram illustrating a structure of a reproduction apparatus according to an embodiment of the present invention.

FIG. 8 is a block diagram illustrating a reproduction apparatus according to the present invention. Referring to FIG. 8, the reproduction apparatus according to an embodiment of the present invention comprises a read unit 820, a search unit 840, and a reproduction unit 850. The read unit 820 reads out the audio-visual data and the metadata from the storage medium. Although not shown, the audio-visual data and the metadata read out by the read unit 820 may be temporarily stored in a buffer unit (not shown) in the read unit 820 and then transmitted to the reproduction unit 850.

The search unit 840 searches the storage medium for the position of the audio-visual data satisfying a predetermined search condition externally input with reference to the metadata. Here, the storage medium includes a plurality of metadata used as a search reference of the audio-visual data.

That is, the search unit 840 receives the metadata from the read unit 820, compares information on the search keywords included in the metadata with the predetermined search condition externally input, and then transmits position information of the audio-visual data included in a play list mark corresponding to the search condition or an additionally-defined mark to the reproduction unit 850. The reproduction unit 850 reproduces the corresponding part of the audio-visual data on the basis of the position information of the audio-visual data searched out by the search unit 840.

Figure 9:
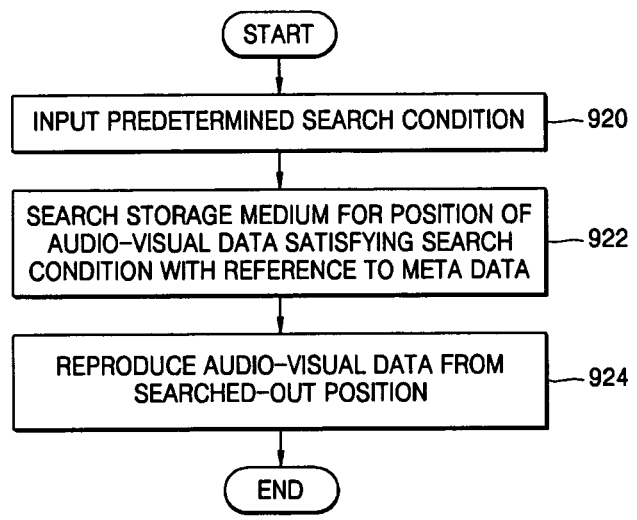
FIG. 9 is a flowchart illustrating a reproduction method using the extended search function according to an embodiment of the present invention.

The reproduction method of reproducing the storage medium including the metadata according to an embodiment of the present invention is described based on the structure described above. FIG. 9 is a flowchart illustrating the reproduction method using the extended search function according to an embodiment of the present invention. Referring to FIG. 9, in order to reproduce the storage medium including the metadata providing the extended search function, a predetermined search condition is first input (operation 920). Next, the audio-visual data and the metadata are read out from the storage medium and a position of the audio-visual data satisfying the predetermined search condition is searched out with reference to the metadata (operation 922). Then, the audio-visual data are reproduced from the searched-out position (operation 924).

Specifically, in searching out the position of the audio-visual data with reference to the metadata, the input search condition and the search keyword information of the metadata are compared with each other to search out a play list mark corresponding to the search condition or an additionally-defined mark, and the corresponding position of the audio-visual data is searched out with reference to the position information included in the searched-out play list mark or the additionally-defined mark.

Hitherto, the data structure, the reproduction apparatus, and the reproduction method to provide the extended search function on the audio-visual data included in the respective titles of the storage medium by using the metadata have been described in detail. In addition, an extended structure of metadata and an embodying method thereof to provide the extended search function on an entire disk as well as the respective titles to enlarge the extended search function will be described.

Figure 10:
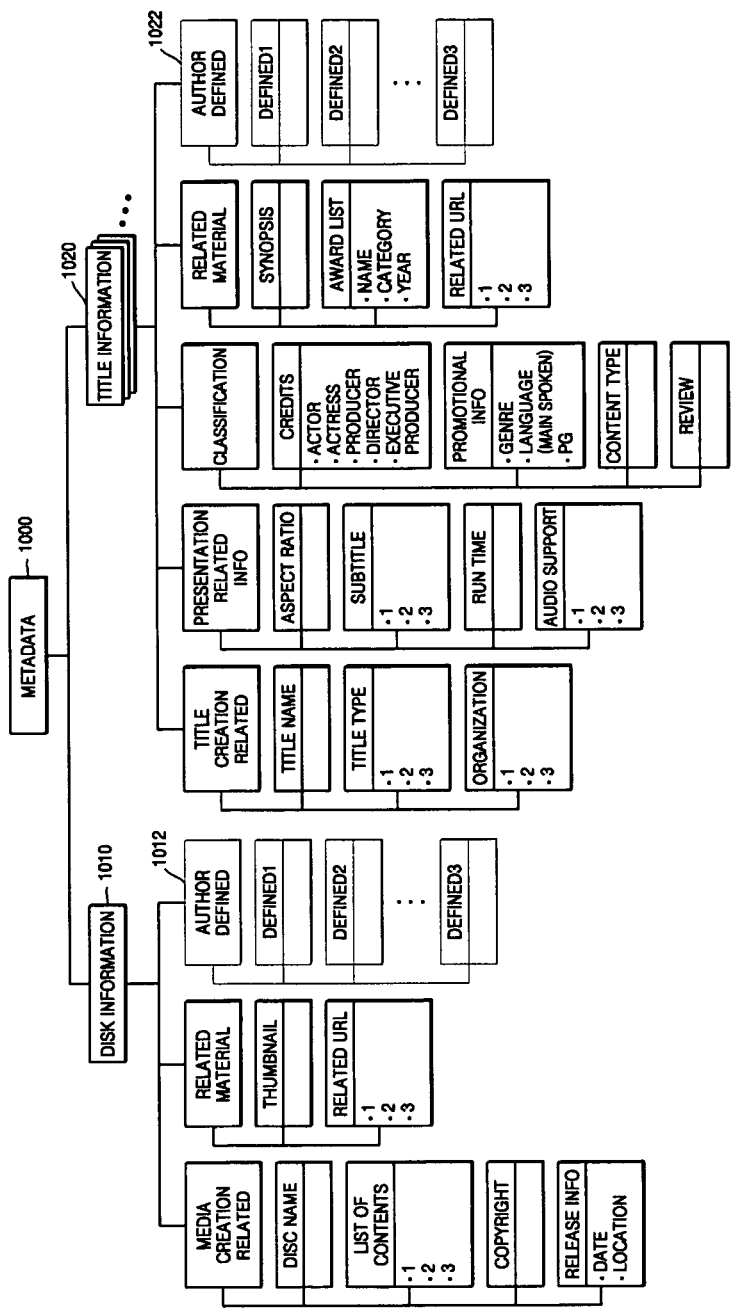
FIG. 10 is a diagram illustrating a structure of metadata on an entire disk according to another embodiment of the present invention.

FIG. 10 is a block diagram illustrating a structure of metadata on the entire disk according to another embodiment of the present invention. Referring to FIG. 10, the metadata for an entire disk according to the present invention includes disk information 1010 used in common with information on the disk or all the titles of the disk and title information 1020 relative to the titles recorded on the disk. The title information 1020 and the disk information 1010 further include metadata 1012 and 1022 which may provide the extended search function and be defined by an author. Accordingly, as shown in FIGS. 1A and 9, providing extended metadata to provide the extended search function on contents stored in the titles or the disk, as well as the metadata to provide the extended search function on the audio-visual data itself, is possible.

More specifically, the disk information 1010 may include metadata relative to production of the disk, metadata relative to resources of the disk, and metadata 1012 defined by the author of the disk. The metadata relative to the production of the disk may include disk name, content list, copyright, release information, etc. The metadata relative to resources of the disk may include thumbnail or URL addresses of relevant information.

On the other hand, similarly to the disk information 1010, the title information 1020 may include metadata relative to production of contents, metadata relative to presentation of the contents, metadata relative to classification of the contents, metadata relative to resources of the contents, and metadata 1022 defined by the author of the contents. The metadata relative to production of the contents may include title name, title type, information on organizations involved in production and release of the title, etc. The metadata relative to presentation of the contents may include aspect ratio, subtitles, run time, information on support for audio, etc. The metadata relative to classification of the contents may include credit, promotion information, content type, review, etc. The credit is information on persons relative to production of the titles and may include information on actor, director, producer, music producer, scenario writer, etc. The promotion information is associated with genre, language, parental guide, etc. The metadata relative to resources of the contents may include synopsis, information on prize, and information on URL addresses of relevant data.

Figure 11:
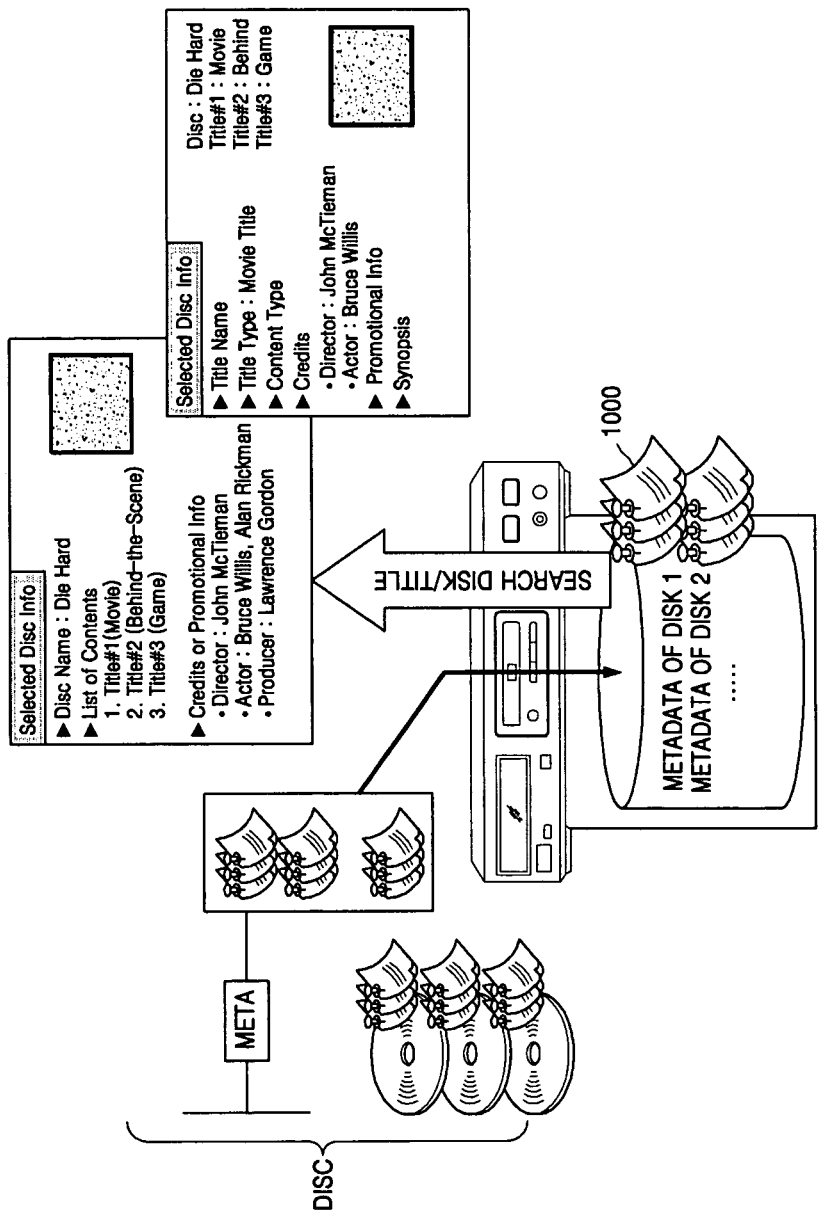
FIG. 11 is a diagram illustrating an example employing the metadata on an entire disk according to another embodiment of the present invention.
Figure 12A:
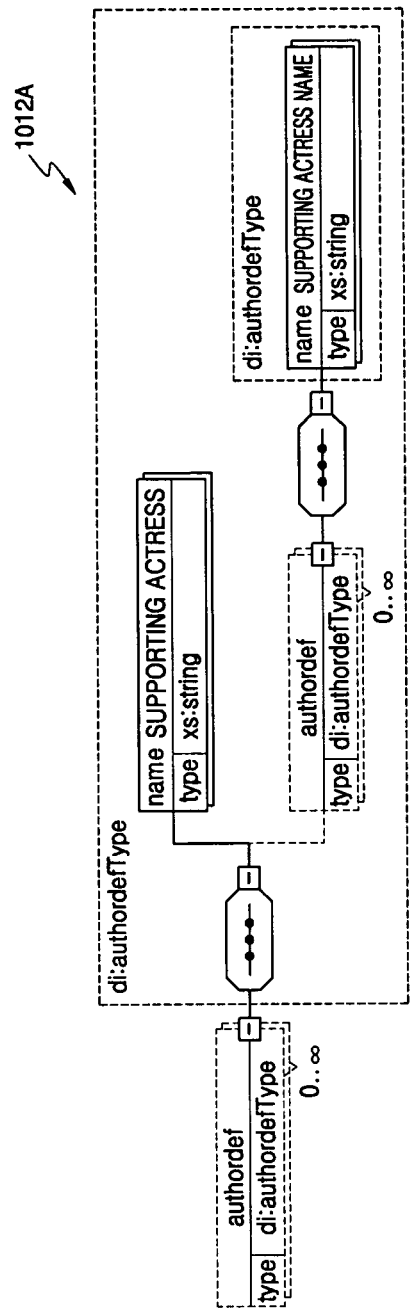
FIGS. 12A and 12B are diagrams illustrating a structure and an example of author-defined metadata included in the metadata on the entire disk according to another embodiment of the present invention.
Figure 12B:
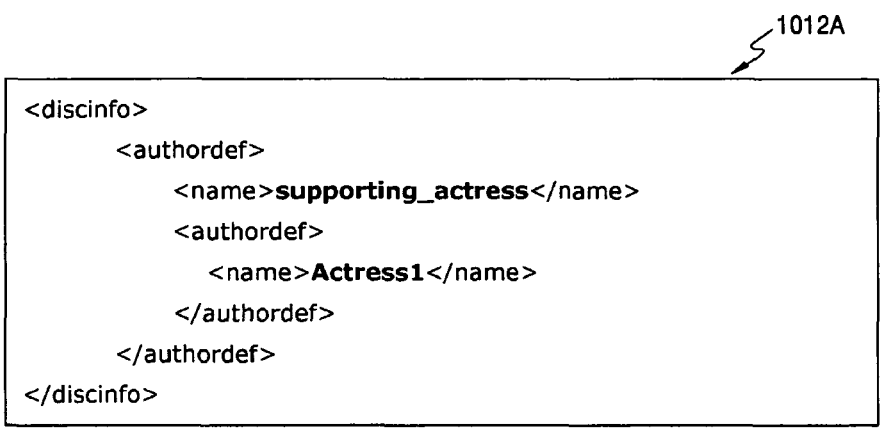

FIG. 11 is a diagram illustrating an example where the metadata for an entire disk is applied according to another embodiment of the present invention. Referring to FIG. 11, the metadata 1000 for an entire disk are stored in a unit of disks or in a unit of volumes in a storage unit such as a hard disk of a reproduction apparatus, when the disk is inserted into and loaded in the reproduction apparatus. Accordingly, even when the disk is removed from the reproduction apparatus, a specific disk or a specific title may be searched out using the metadata 1000 (also referred to as a disk library) stored in a unit of disks or in a unit of volumes in the storage unit. Specifically, the specific disk or the specific title may be searched out using the metadata 1012 and 1022 additionally defined by the author as well as disk information or title information defined in advance as shown in detail in FIG. 10. That is, while the extended search shown in FIGS. 1A to 9 is restricted to the audio-visual data of a title, the extended search shown in FIGS. 10 and 11 is enlarged to the entire disk. In addition, while it is an important purpose of the former to search out the position of the audio-visual data satisfying the search condition and to reproduce the audio-visual data from the searched-out position, it is an important purpose of the latter to display the contents satisfying the search condition in a type of disk information or title information. FIGS. 12A and 12B are diagrams illustrating a structure of author-defined metadata included in the metadata for the entire disk and an example thereof according to another embodiment of the present invention.

Referring to FIG. 12A, when an author wants to additionally define metadata in addition to the descriptors of the metadata defined in advance, the author-defined metadata "authordef" 1012A may be used. For example, when the author intends to add information on a supporting actress, the supporting actress is input to Element name of "authordef", another "authordef" is defined as a specific element of the "authordef", and the name of the supporting actress is input to Element "name" of the newly defined "authordef".

An example in which the author-defined metadata are embodied in a markup document type is shown in FIG. 12B. Referring to FIG. 12B, the disk information element includes the author-defined element <authordef>, which includes Element <name> specifying the element name. The element <authordef> includes another element <authordef> as a specific element in which <name> may be defined. For example, in order to define the author-defined metadata for a supporting actress, "supporting_actress" may be specified in the element <name> of the generic element <authordef>, and "Actress1" may be specified in the element <name> of the specific element <authordef>.

Figure 13A:
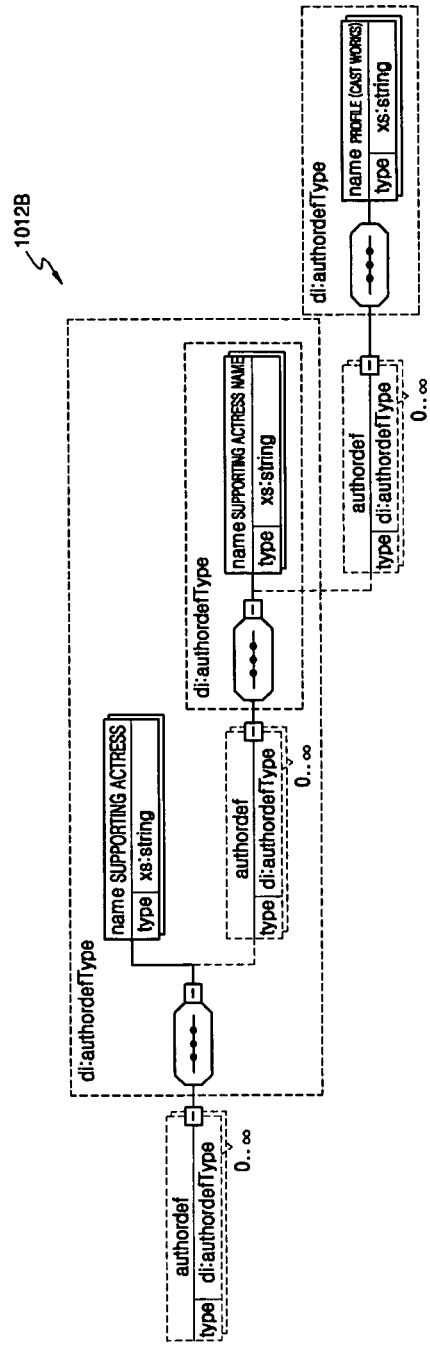

FIGS. 13A and 13B are diagrams illustrating a nesting structure of author-defined metadata and an example thereof. Referring to FIGS. 13A and 13B, an element "supporting actress name" is defined as a specific element of an element "supporting actress" and an element "profile (cast works)" is defined as a specific element of the element "supporting actress name". In this way, providing hierarchical metadata using the author-defined elements <authordef> and <name> is possible. That is, by adding the author-defined information using the metadata "authordef", classifying and displaying more detailed information through the nesting of the element "authordef" is possible.

Figure 14:
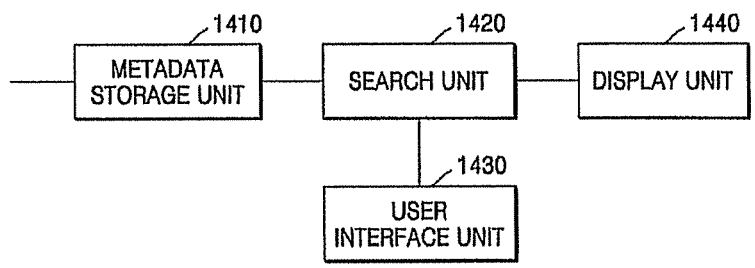
FIG. 14 shows an example of a reproduction apparatus providing disk information or title information using the extended search function according to another embodiment of the present invention.

On the other hand, FIG. 14 shows an example of a reproduction apparatus providing disk information or title information using the extended search function according to another embodiment of the present invention. Referring to FIG. 14, the reproduction apparatus allows a search unit 1420 to search a metadata storage unit for metadata in accordance with an input search condition through a user interface unit 1430 and to output the results of the search through a display unit 1440. The multimedia data reproduction apparatus comprises the metadata storage unit 1410, the search unit 1420, the user interface unit 1430, and the display unit 1440. The metadata storage unit 1410 receives metadata from a storage medium such as a disk and stores the received metadata. When a user inserts a storage medium into the multimedia data reproduction apparatus and the reproduction apparatus loads the storage medium once, the metadata relative to the storage medium are not deleted but remains in the metadata storage unit 1410, even when the storage medium is ejected. The user inputs search conditions for the metadata to the user interface unit 1430. That is, keywords for disk name, actor, actress, director, etc., are input using a remote controller or other devices. The search unit 1420 searches the metadata and outputs the metadata corresponding to the user's search condition to the display unit 1440.

Figure 15:
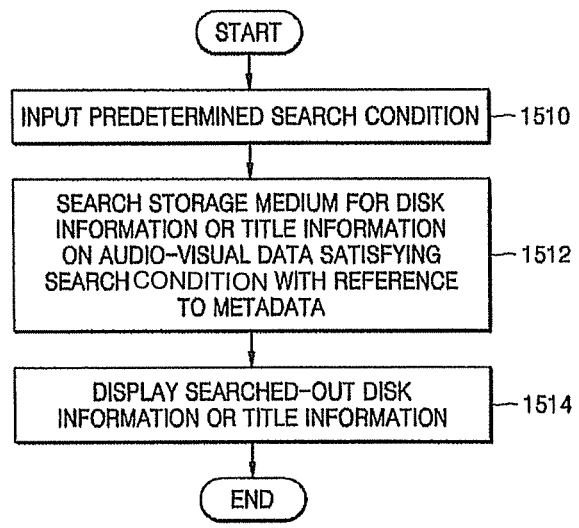
FIG. 15 is a flowchart illustrating a method of providing the disk information or the title information using the extended search function according to another embodiment of the present invention.

On the other hand, FIG. 15 is a flowchart illustrating a method of providing disk information or title information using the extended search function according to another embodiment of the present invention.

Referring to FIG. 15, a predetermined search condition is input (operation 1510). Metadata are read out from a disk library stored in the metadata storage unit 1410 such as a hard disk and disk information or title information satisfying the search condition is searched out with reference to the read-out metadata (operation 1512). The searched-out disk information or title information is displayed on the display unit (operation 1514). As a result, the disk information or title information corresponding to the search condition may be provided to the user.

As is described above, according to aspects of the present invention, there is provided a storage medium including metadata, which provide an extended search function using a variety of search keywords on audio-visual data, and reproduction apparatus and method of reproducing the storage medium.

Specifically, the metadata according to aspects of the present invention provide the search keywords which may be additionally defined by an author, in addition to the predefined search keywords.

Accordingly, the conventional problem may be solved that the audio-visual data or the metadata in a storage medium once produced could not be edited or reused, so that providing an extended search function using a variety of keywords defined by an author at the time of reproduction is possible.

Furthermore, by recording only portions of the metadata directly relative to the support for multiple languages in an additional text-based file, providing an extended search function using a plurality of languages is possible.

Further, providing an extended search function of searching out and displaying the information on contents in a unit of disks or in a unit of titles is also possible.

On the other hand, the extended search method according to aspects of the present invention may be embodied as computer programs. Codes and code segments constituting the programs may be easily construed by programmers skilled in the art. The programs may be stored in a computer readable medium and read by a computer, thereby embodying the extended search method. Examples of the computer readable medium include magnetic media and optical media. Of course, other types of computer readable media are possible.

Figure 16:
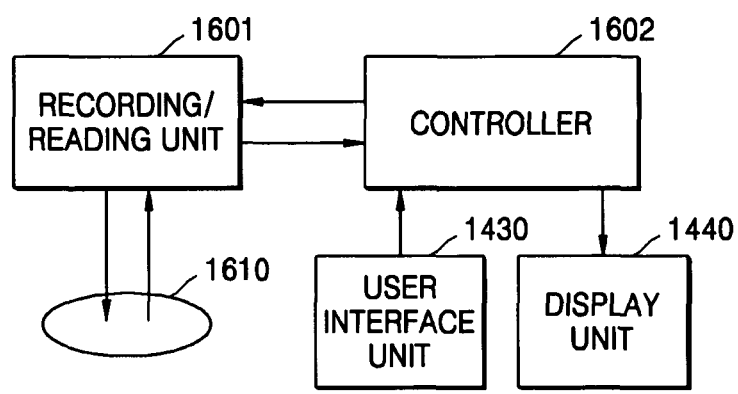
FIG. 16 shows a recording and/or reproducing apparatus according to an embodiment of the invention.

FIG. 16 is a block diagram of a recording and/or reproducing apparatus according to an embodiment of the present invention. Referring to FIG. 16, the recording and/or reproducing apparatus for use with a user interface unit and a display unit to provide disk information and/or title information using an extended search function includes a recording/reading unit 1601, a controller 1602, and an optical disk 1610 onto which and from which data is recorded/reproduced by the recording/reading unit 1601 according to the control of the controller 1602. According to embodiments of the invention, the controller 1602 includes the metadata storage unit 1410 and the search unit 1420, as shown in FIG. 14. As such, the controller 1602 is able to store metadata associated with the disk information and is further able to search in the stored metadata in accordance with an input search condition through the user interface unit 1430 of FIG. 14. Further, the controller 1602 outputs the results of the search through the display unit 1440 as set forth in relation to the discussion above and to FIG. 14. It is understood, that the user interface includes but is not limited to one or more keyboards, a mouse or mice, one or more voice command receptors, or combinations thereof. Similarly, the display unit may be a monitor, a TV screen, or the like.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer-readable medium which is used in a reproducing apparatus, comprising:
audio-visual data comprising a plurality of scenes; and
metadata comprising at least one search keyword which is used by the reproducing apparatus in searching for each of the scenes of the audio-visual data, the at least one search keyword comprising a predefined search keyword indicating a scene or a character and an author defined search keyword which is to be additionally defined by an author, the author defined search keyword enabling the author to add information that is necessary to describe content of the storage medium, the author defined search keyword comprising an author-defined descriptor which is a descriptor identifying that the corresponding descriptor is the author defined search keyword, the author-defined descriptor comprising a name descriptor which is used in describing the value of the author defined search keyword.

2. The computer-readable medium according to claim 1, wherein the author-defined descriptor comprises another author-defined descriptor as a child element.

3. The computer-readable medium according to claim 1, wherein the predefined search keyword is allocated to a predetermined bit of the keyword descriptor.

4. The computer-readable medium according to claim 1, wherein the author-defined search keyword is allocated to a predetermined bit of the keyword descriptor.

5. The computer readable medium according to claim 4, wherein the additional text-based file comprises an element and/or an attribute indicating the author-defined search keyword among the search keywords specified by the keyword descriptors.

6. The computer-readable medium according to claim 5, wherein the additional text-based file comprises an element and/or an attribute indicating keyword values of the search keywords specified by the keyword descriptors.

7. The computer-readable medium according to claim 1, wherein the additional text-based file comprises information on supported languages in file names and/or attributes and/or elements.

8. The computer-readable medium according to claim 1, wherein the additional text-based file comprises an identifier of the storage medium and/or title identifier information for the binding to the audio-visual data.

9. A reproduction apparatus, comprising:
a search unit configured to search a storage medium for a position of audio-visual data satisfying a predetermined search condition with reference to metadata, the storage medium comprising the audio-visual data comprising a plurality of scenes and the metadata comprising at least one search keyword which is used by the reproducing apparatus in searching for each of the scenes of the audio-visual data; and
a reproduction unit configured to reproduce the audio-visual data from the searched-out position,
wherein the at least one search keyword comprises a predetermined search keyword indicating a scene or a character and an author defined search keyword which may be additionally defined by an author,
wherein the author defined search keyword enables the author to add information that is necessary to describe content of the storage medium,
wherein the author defined search keyword comprises an author-defined descriptor which is a descriptor identifying that the corresponding descriptor is the author defined search keyword, and
wherein the author-defined descriptor comprises a name descriptor which is used in describing the value of the author defined search keyword.

10. The reproduction apparatus according to claim 9, wherein the search unit is further configured to select the metadata corresponding to language information supporting subtitle, audio, or menu stored in a system parameter.

11. A reproduction method, comprising:
searching a storage medium for a position of audio-visual data satisfying a predetermined search condition with reference to metadata, the storage medium comprising the audio-visual data comprising a plurality of scenes, the metadata comprising at least one search keyword which is used by a reproducing apparatus in searching for each of the scenes of the audio-visual data; and
reproducing the audio-visual data from the searched-out position,
wherein the at least one search keyword comprises a predetermined search keyword indicating a scene or a character and an author defined search keyword which are additionally definable by an author,
wherein the author defined search keyword enables the author to add information that is necessary to describe content of the storage medium,
wherein the author defined search keyword comprises an author-defined descriptor which is a descriptor identifying that the corresponding descriptor is the author defined search keyword, and
wherein the author-defined descriptor comprises a name descriptor which is used in describing the value of the author defined search keyword.

12. A structure of audio/visual (AV) data stream encoded on a computer-readable medium to be reproduced by a reproducing apparatus, the AV data stream including at least one AV data clip comprising a plurality of scenes and metadata, the A/V data stream comprising:
a play list configured to indicate a play sequence which specifies a reproduction order of the clip, the play list comprising:
a plurality of play items comprising information of the clip and a reproducing position in the clip; and
a play list mark, comprising the metadata, configured to include at least one search keyword which is used by the reproducing apparatus in searching for each of the scenes of the clip;
wherein the at least one search keyword comprises a predefined search keyword indicating a scene or a character and an author defined search keyword additionally defined by an author,
wherein the author defined search keyword comprises an author-defined descriptor which is a descriptor identifying that the corresponding descriptor is the author defined search keyword, and
wherein the author-defined descriptor comprises a name descriptor which is used in describing the value of the author defined search keyword.

13. The structure according to claim 12, wherein the metadata is defined separately from the play list mark.

14. The structure according to claim 12, wherein the metadata is recorded in a binary type or a text type independent of the play list.

15. The structure according to claim 12, wherein the play list mark comprises:
an inherent identifier field configured to indicate an identifier of the play list mark;
a mark type field configured to indicate a purpose of the play list mark;
a keyword field and a description field configured to be effective only when the mark type is a metadata mark;
an inherent identifier field configured to indicate the identifier of the play item corresponding to the mark; and
a mark time stamp field configured to indicate time information, comprising time points of the play item at which the play list mark is positioned.

16. The structure according to claim 15, wherein any one of an entry mark, a link point, and a metadata mark is allocated to the mark type field to indicate a purpose of the play list mark.

17. The structure according to claim 16, wherein the metadata mark is allocated to the mark type field.

18. The structure according to claim 15, wherein:
keywords in the keyword field and descriptions in the description field that are directly relative to the support for multiple languages are embodied in additional text-based metadata; and
identifier information or the time information of the metadata that are unrelated to the support for multiple languages are included in a binary type in the main AV data stream.

19. The structure according to claim 18, wherein the text-based metadata exists separately from the play list mark.

20. The structure according to claim 12, wherein the metadata enables an author to newly define a search keyword to search the clip, to designate a keyword value, and/or to add a variety of search keywords to search the clip.

21. The structure according to claim 12, wherein the metadata comprises disk information relative to titles recorded in a disk to provide an extended search function to allow searching on contents stored in the titles.

22. The structure according to claim 21, wherein the disk information relative to the titles recorded in the disk comprises metadata relative to production of contents, metadata relative to presentation of the contents, metadata relative to classification of the contents, metadata relative to resources of the contents, and metadata defined by an author of the contents.

23. The structure according to claim 12, wherein the metadata comprises disk information relative to a production of a disk, to resources of the disk, data defined by an author of the disk.

24. The structure according to claim 12, wherein the metadata is stored in a unit of disks and/or in a unit of volumes in a storage unit.

* * * * *